(12) United States Patent
Huang et al.

(10) Patent No.: US 6,880,620 B2
(45) Date of Patent: Apr. 19, 2005

(54) HEATING, VENTILATING, AND AIR CONDITIONING MODULE HAVING AN IMPROVED HEATER CORE CONFIGURATION

(75) Inventors: Lin-Jie Huang, East Amherst, NY (US); Mohinder Singh Bhatti, Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 14 days.

(21) Appl. No.: 10/179,576

(22) Filed: Jun. 25, 2002

(65) Prior Publication Data

US 2003/0234098 A1 Dec. 25, 2003

(51) Int. Cl.[7] ............................ F25B 29/00; B60H 1/00; B60H 3/00
(52) U.S. Cl. ............................ 165/43; 165/42; 165/146; 165/903; 454/156; 454/160; 454/161; 237/12.3 A; 237/12.3 B
(58) Field of Search ............................ 165/43, 42, 146, 165/903, 202, 103; 454/156, 160, 161; 237/12.3 B, 12.3 A

(56) References Cited

U.S. PATENT DOCUMENTS

| | | | |
|---|---|---|---|
| 3,545,224 A | * 12/1970 | Nicoski | |
| 4,958,500 A | * 9/1990 | Kuroda et al. | |
| 5,335,718 A | 8/1994 | Smith | 165/42 |
| 5,388,426 A | 2/1995 | Wada et al. | 62/263 |
| 5,575,326 A | 11/1996 | Asami et al. | 165/124 |
| 5,669,229 A | 9/1997 | Ohbayashi et al. | 62/259.1 |
| 5,727,731 A | 3/1998 | Arakawa et al. | 237/12.3 B |
| 5,755,282 A | 5/1998 | Teshima et al. | 165/202 |
| 5,758,719 A | 6/1998 | Yoshihashi et al. | 165/119 |
| 5,918,666 A | 7/1999 | Chin | 165/122 |
| 5,927,380 A | 7/1999 | Soccia | 165/11.1 |
| 5,934,361 A | 8/1999 | Parisi et al. | 165/43 |
| 6,045,444 A | 4/2000 | Zima et al. | 454/121 |

FOREIGN PATENT DOCUMENTS

| | | | |
|---|---|---|---|
| DE | 3118539 | * | 12/1982 |
| DE | 3344212 | * | 9/1985 |
| DE | 3533196 | * | 3/1987 |
| DE | 3814086 | | 11/1988 |
| DE | 4227565 | | 11/1993 |
| DE | 19641642 | | 4/1997 |
| DE | 19743656 | * | 4/1999 |
| EP | 0236216 | * | 9/1987 |
| JP | 4-316931 | * | 11/1992 |
| JP | 8-327137 | * | 12/1996 |
| JP | 9-42697 | * | 2/1997 |
| JP | 10-19480 | * | 1/1998 |
| JP | 10-58961 | * | 3/1998 |
| JP | 10-61438 | * | 3/1998 |
| JP | 2001-183000 | * | 7/2001 |

OTHER PUBLICATIONS

EP 748708, One Picture and Derwent Abstract Dec. 1996.*

* cited by examiner

Primary Examiner—John K. Ford
(74) Attorney, Agent, or Firm—Patrick M. Griffin

(57) ABSTRACT

The subject invention includes a heating, ventilating, and air conditioning (HVAC) assembly having a housing with an inlet and at least one outlet for directing a flow of air into a passenger compartment. An evaporator core is disposed within the housing downstream of the inlet and upstream from the outlet. A heater core is disposed within the housing between the evaporator core and the outlet with the heater core having an upstream surface generally facing the evaporator core and a downstream surface generally facing the outlet. The heater core includes a first portion and a second portion being angled relative to the first portion such that the upstream surface of the first portion at least partially faces the upstream surface of the second portion to define an angled heater core facing the evaporator core wherein air flowing over the upstream surfaces is evenly distributed across both of the first and second portions, thereby increasing the effectiveness of the heater core.

9 Claims, 7 Drawing Sheets

FIG - 6
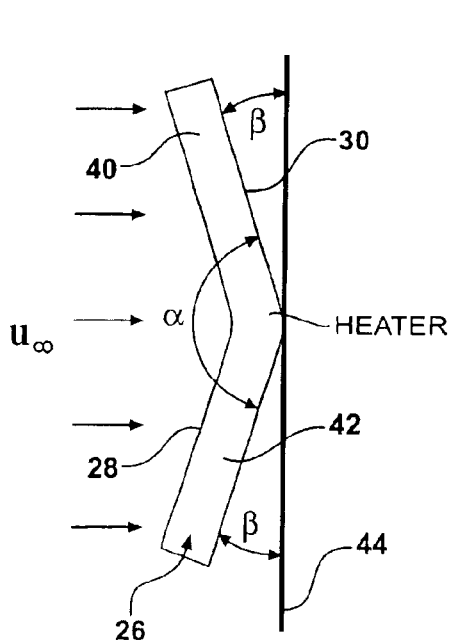
FIG - 7
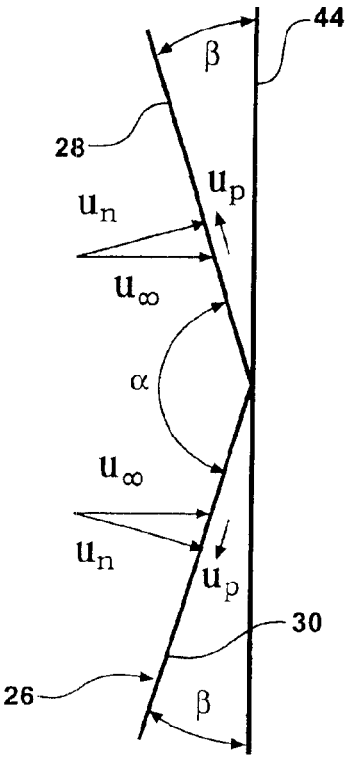
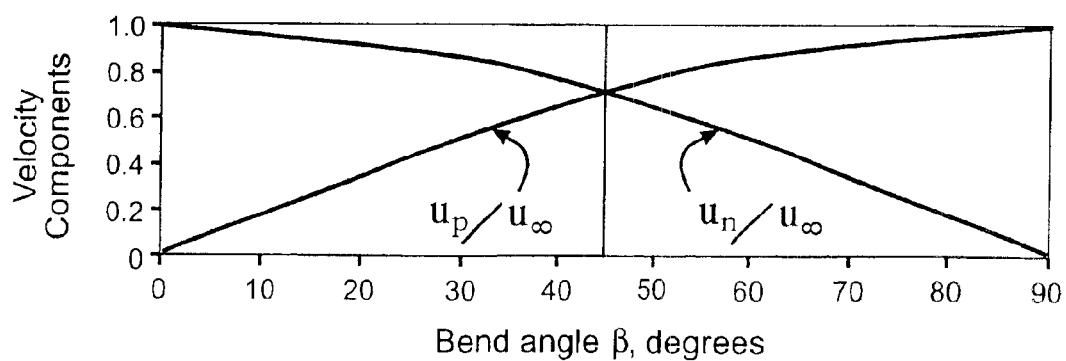
FIG - 8

HEATING, VENTILATING, AND AIR CONDITIONING MODULE HAVING AN IMPROVED HEATER CORE CONFIGURATION

BACKGROUND OF THE INVENTION

1. Field of the Invention

The subject invention relates to an improved heater core configuration for a heating, ventilating, and air conditioning module.

2. Description of the Prior Art

Automotive heating, ventilating, and air conditioning (HVAC) modules typically incorporate a hollow housing disposed within in a vehicle. An evaporator core and a heater core, as well as various valves for directing a flow of air, are mounted within the housing. The heater core is usually located within a lower quadrant of the housing and is used to heat the air that flows into a passenger compartment of the vehicle.

There have been numerous designs for the housings and heater cores to maximize the effectiveness of the heater core. As illustrated in U.S. Pat. Nos. 5,927,380 and 6,045,444, the heater cores within automotive HVAC modules typically have flat rectangular configurations. The flow of air over the flat rectangular heater cores has a tendency to stagnate in certain areas thereby reducing the operable effectiveness of the heater core.

Accordingly, it would be desirable to develop a heater core which allows for uniform flow of air over an entire outer surface of the heater core while maximizing a temperature increase across the heater core and minimizing a pressure drop across the beater core.

SUMMARY OF THE INVENTION AND ADVANTAGES

The subject invention includes a heating, ventilating, and air conditioning (HVAC) assembly or module for heating, venting, and cooling a passenger compartment of a vehicle. The HVAC module comprises a hollow housing having an inlet and at least one outlet for directing a flow of air into the passenger compartment. A first heat exchanger, preferably an evaporator core, is disposed within the housing downstream of the inlet 14 and upstream from the outlet with the evaporator core arranged and configured for intercepting substantially all of the air flowing into the passenger compartment. A second heat exchanger, preferably a heater core, is disposed within the housing between the evaporator core and the outlet with the heater core having an upstream surface generally facing the evaporator core and a downstream surface generally facing the outlet. The heater core includes a first portion and a second portion being angled relative to the first portion such that the upstream surface of the first portion at least partially faces the upstream surface of the second portion to define an angled heater core facing the evaporator core wherein air flowing over the upstream surfaces is evenly distributed across both of the first and second portions, thereby increasing the effectiveness of the heater core.

The subject invention also includes a method of optimizing a flow of air over the angled heater core. The method comprises the steps of; measuring an incoming temperature of the air adjacent the upstream surface of the heater core; measuring an outgoing temperature of the air adjacent the downstream surface of the heater core; calculating a variance between the incoming and outgoing temperatures of the air to determine a temperature increase across the heater core; measuring an incoming pressure of the air adjacent the upstream surface of the heater core; measuring an outgoing pressure of the air adjacent the downstream surface of the heater core; calculating a variance between the incoming and outgoing pressures of the air to determine a pressure drop across the heater core; and adjusting the angular position the first portion of the heater core relative to the second portion of the heater core until the temperature increase across the heater core is maximized and the pressure drop across the heater core is minimized, thereby determining the optimum relative positions of the first and second portions for the angled heater core.

Accordingly, the subject invention sets forth an improved heater core which is angled such that air uniformly flows over an entire outer surface of the heater core while maximizing a temperature increase across the heater core and minimizing a pressure drop across the heater core.

BRIEF DESCRIPTION OF THE DRAWINGS

Other advantages of the present invention will be readily appreciated as the same becomes better understood by reference to the following detailed description when considered in connection with the accompanying drawings wherein:

FIG. 6 is a schematic side view of the heater core;

FIG. 7 is a schematic side view of the heater core illustrating velocity components for the air;

FIG. 8 is a graph illustrating the relationships between various velocity components relative to various bend angles $\beta$ of the heater core.

DETAILED DESCRIPTION OF THE PREFERRED EMBODIMENT

Figure 1:
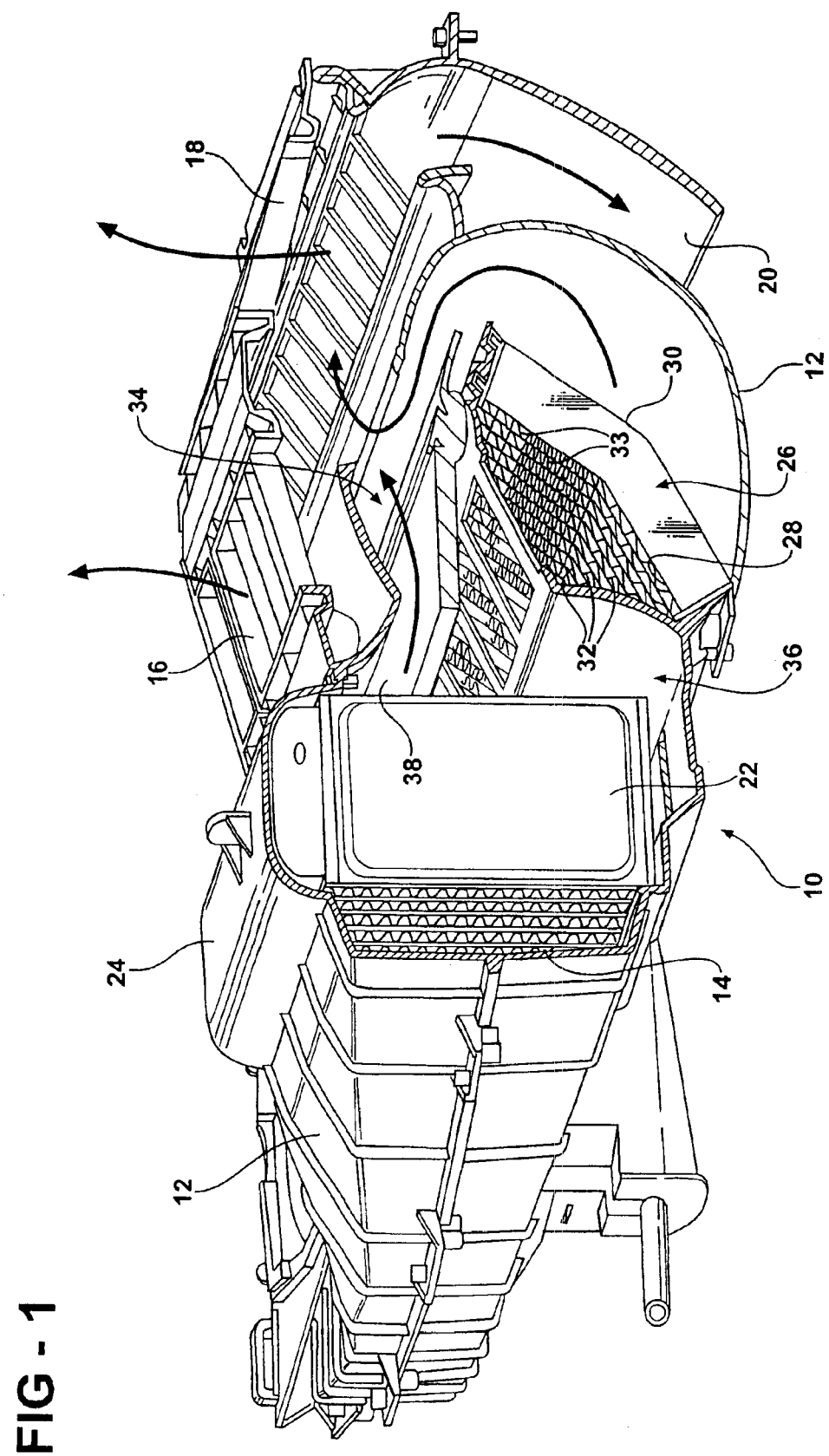
FIG. 1 is a partially cross sectional perspective view of a heating, ventilating, and air conditioning (HVAC) assembly or module in accordance with the subject invention with a flow valve in a mid position.
Figure 2:
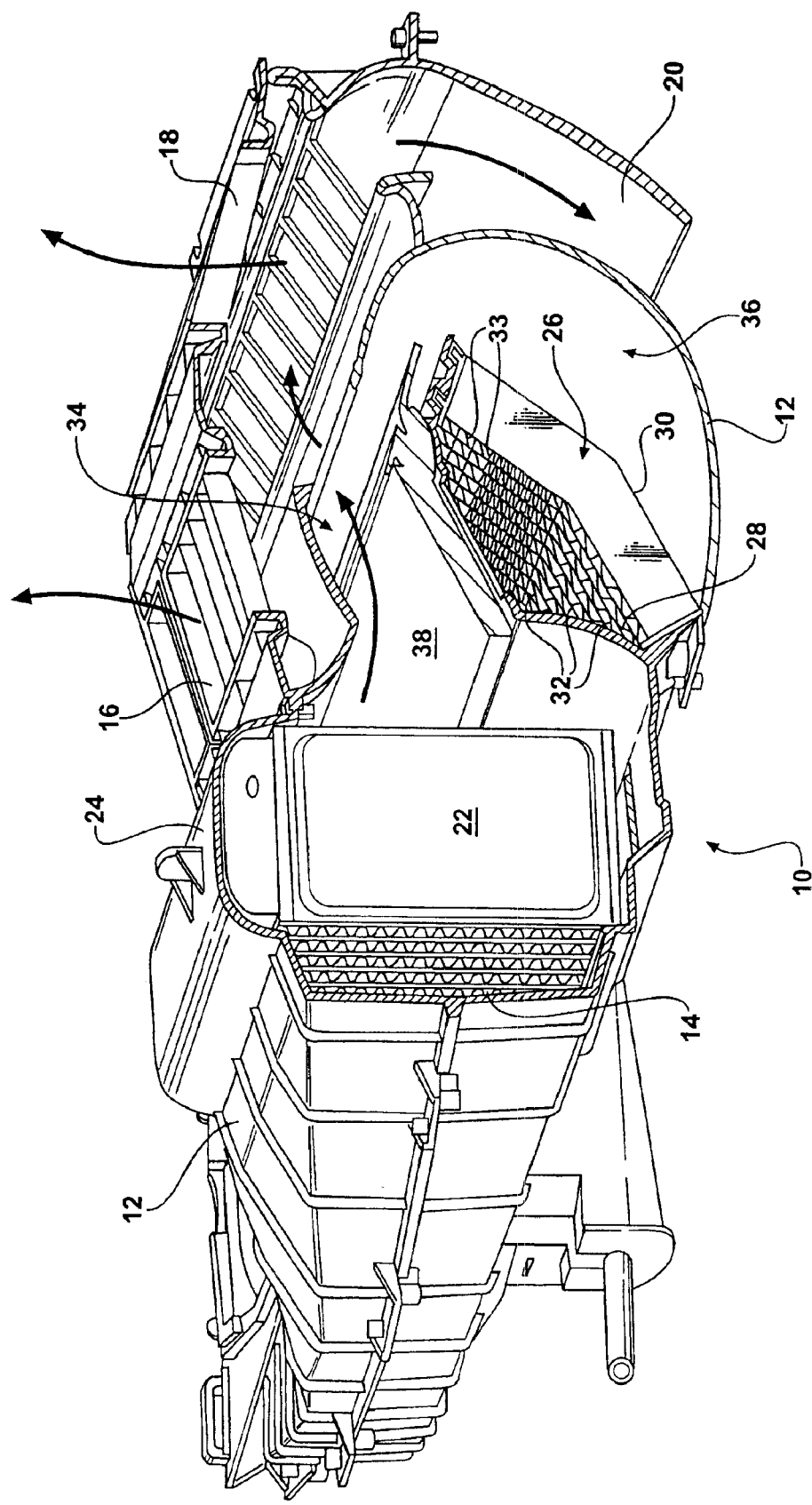
FIG. 2 is a partially cross sectional perspective view of the HVAC module with the flow valve in a cooling position.

Referring to the Figures, wherein like numerals indicate like or corresponding parts throughout the several views, a heating, ventilating, and air conditioning (HVAC) assembly or module for heating, venting, and cooling a passenger compartment of a vehicle (not shown) is generally illustrated at 10 in FIGS. 1 and 2. The HVAC module 10 includes a hollow housing 12 having an inlet 14 and at least one outlet 16,18,20 for directing a flow of air into the passenger compartment. Preferably, there are three outlets 16,18,20 for distributing the flow of air throughout the passenger compartment. Specifically, there is a windshield/defrosting outlet 16, an upper passenger compartment outlet 18, and a lower passenger compartment outlet 20. The upper passenger compartment outlet 18 distributes air to an upper duct (not shown) which in turn transfers the air to passenger vents disposed along a dashboard (not shown). The lower passenger compartment outlet 20 distributes air to a lower duct (not shown) which in turn transfers the air to a floorboard or foot area vents (not shown). Arrows are provided to illustrate the flow of air through the housing 12 and the outlets 16,18,20. The general configuration of the housing 12 and location and number of outlets are well known to those skilled in the HVAC art and may be of any suitable design.

A first heat exchanger 22 is disposed within the housing 12 downstream of the inlet 14 and upstream from the outlets 16,18,20. Preferably, the first heat exchanger 22 is an evaporator core 22. The evaporator core 22 is arranged and configured to intercept substantially all of the air flowing into the passenger compartment. Preferably, the housing 12 includes an evaporator core mounting area 24 which is positioned adjacent the inlet 14 of the housing 12. The evaporator core 22 is secured to the housing 12 in the evaporator core 22 mounting area 24 and is large enough to completely extend across the inlet 14. Hence, air flowing from the inlet 14 toward the outlets 16,18,20 passes through the evaporator core 22. The evaporator core 22 cools and dehumidifies the air flowing therethrough as is known in the HVAC art. It should also be appreciated that the evaporator core 22 may be of any suitable design or configuration without deviating from the scope of the subject invention.

A second heat exchanger 26 is also disposed within the housing 12 between the evaporator core 22 and the outlets 16,18,20. Preferably, the second heat exchanger 26 is a heater core 26 with the heater core 26 having an upstream surface 28 generally facing the evaporator core 22 and a downstream surface 30 generally facing the outlet 16,18,20. The heater core 26 includes opposing manifolds 31 with a plurality of fins 32 and tubes 33 extending along the length thereof between the manifolds 31. Inlet 35 and outlet 37 ports are disposed on one or more of the manifolds 31 to transfer liquid through the tubes 33 between the manifolds 31 thereby facilitating the necessary heat transfer between the liquid and the air. The fins 32, tubes 33, manifolds 31 and remaining portions of the heater core 26 are designed and configured in a manner known to those skilled in the heat exchanger arts. Further details of the preferred heater core 26 will be discussed in greater detail below.

The housing 12 further includes an upper quadrant 34 and a lower quadrant 36 with the evaporator core 22 disposed within both of the quadrants and the heater core 26 disposed within the lower quadrant 36. Hence, air flowing through the upper quadrant 34 will be for venting and cooling, and air flowing through the lower quadrant 36 will be for heating.

At least one, and preferably more than one, flow valve 38 is disposed within the housing 12 for controlling the flow of air between the upper 34 and lower 36 quadrants. The flow valve 38 directs the flow of air such that heated, vented, and/or cooled air can be distributed through the outlets 16,18,20 as desired.

Referring also to FIGS. 3A–5, the heater core 26 is now discussed in greater detail. The heater core 26 includes a first portion 40 and a second portion 42 being angled relative to the first portion 40. Preferably, the angled heater core 26 faces the evaporator core 22 such that the upstream surface 28 of the first portion 40 at least partially faces the upstream surface 28 of the second portion 42. Because of this angled feature, air flowing over the upstream surfaces 28 is more evenly distributed across both of the first 40 and second 42 portions, thereby increasing the effectiveness of the heater core 26, see FIG. 5. In other words, the temperature increase across the heater core 26 is maximized and the pressure drop across the heater core 26 is minimized.

Each of the first 40 and second 42 portions preferably have a substantially flat rectangular configuration with a central region and a peripheral region. The central regions abut each other such that the first 40 and second 42 portions create a continuous angled heater core 26.

Figure 3A:
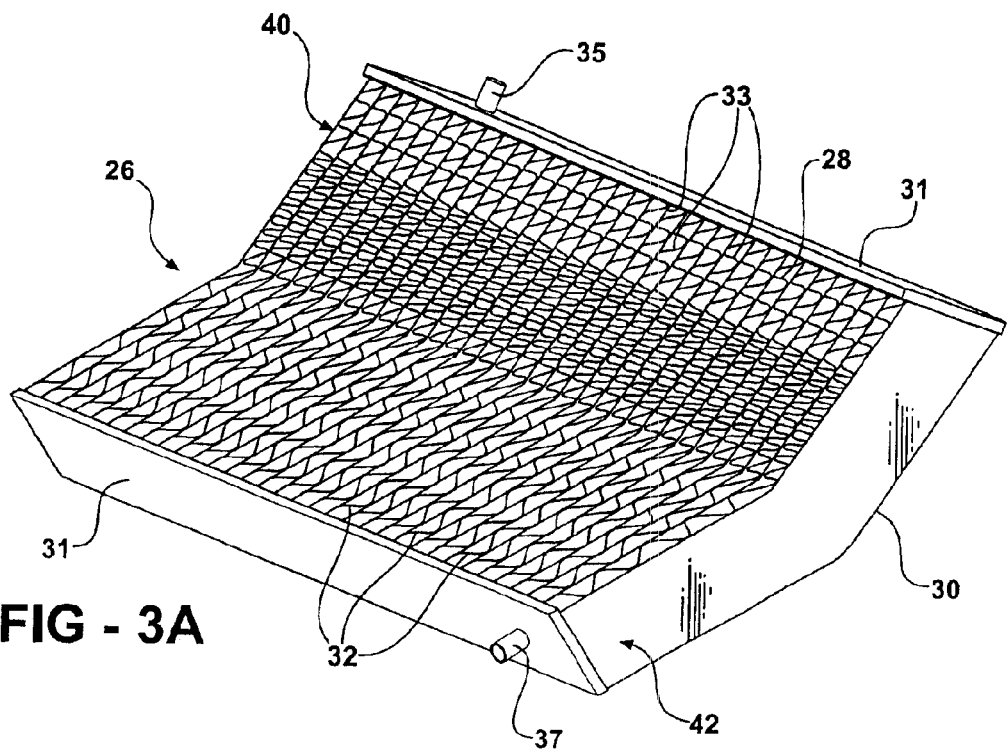
FIG. 3A is a perspective view of a heater core of the subject invention having bent tubes and fins extending in a vertical direction wherein the fins are spaced in a non-uniform manner.
Figure 3B:
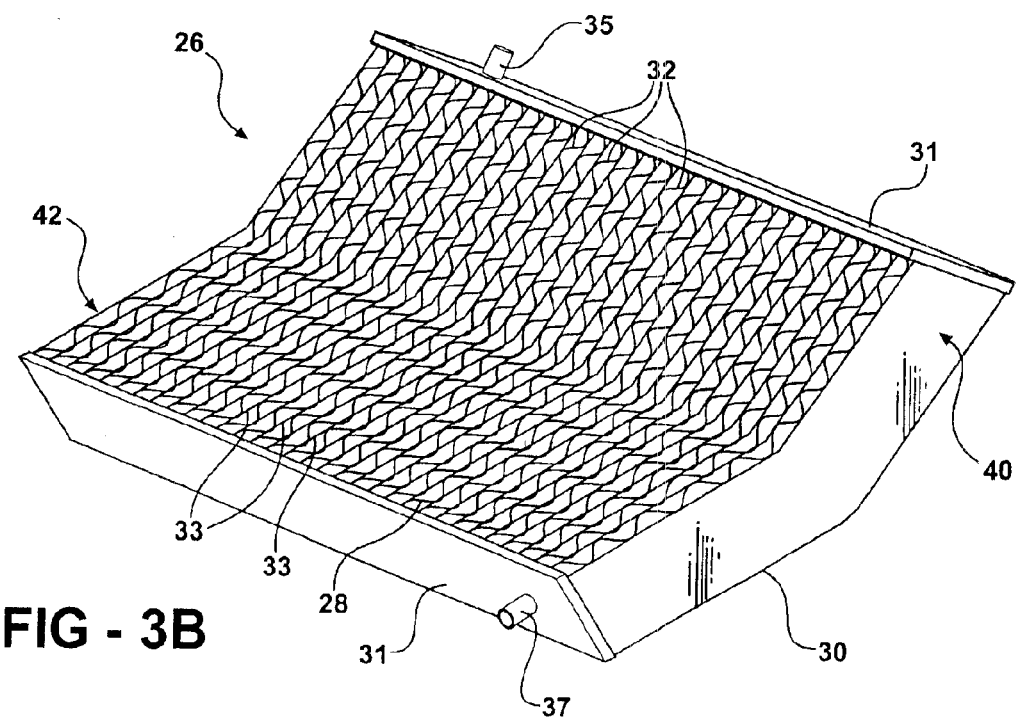
FIG. 3B is a perspective view of another heater core having bent tubes and fins extending in a vertical direction with the fins being spaced in a uniform manner.
Figure 4A:
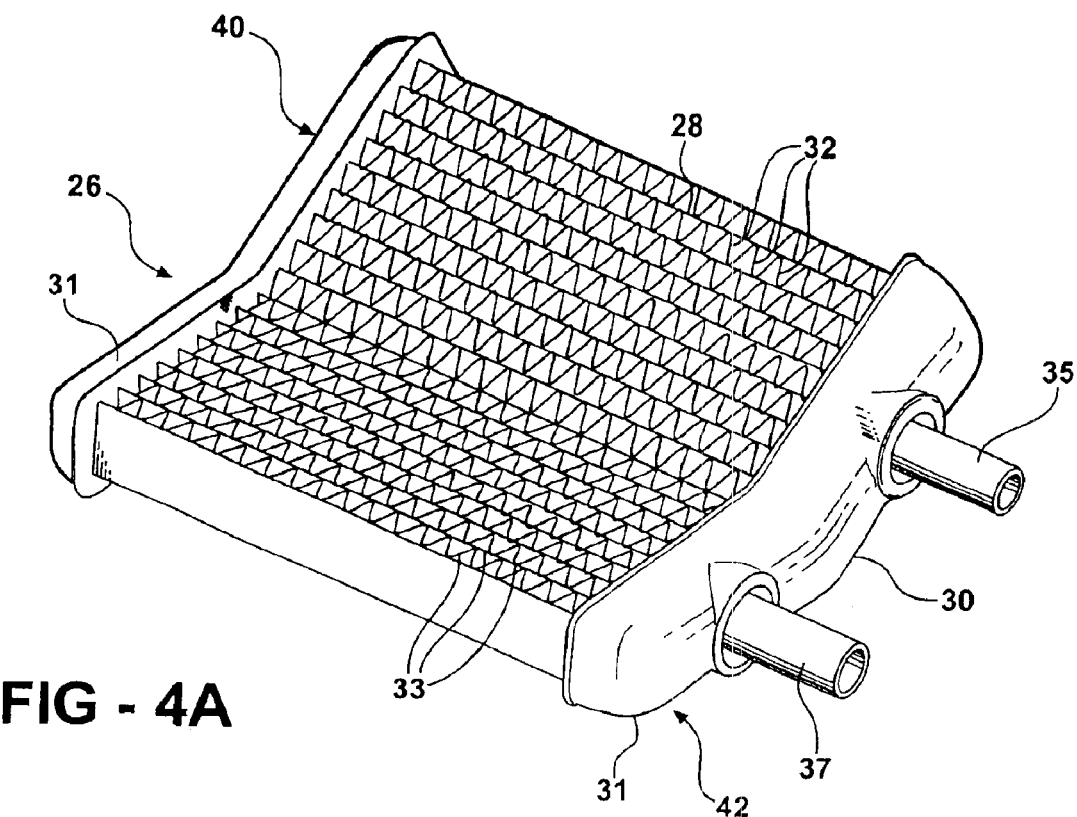
FIG. 4A is a perspective view of yet another heater core of the subject invention having tubes and fins extending in a horizontal direction wherein the fins are spaced in a non-uniform manner.
Figure 4B:
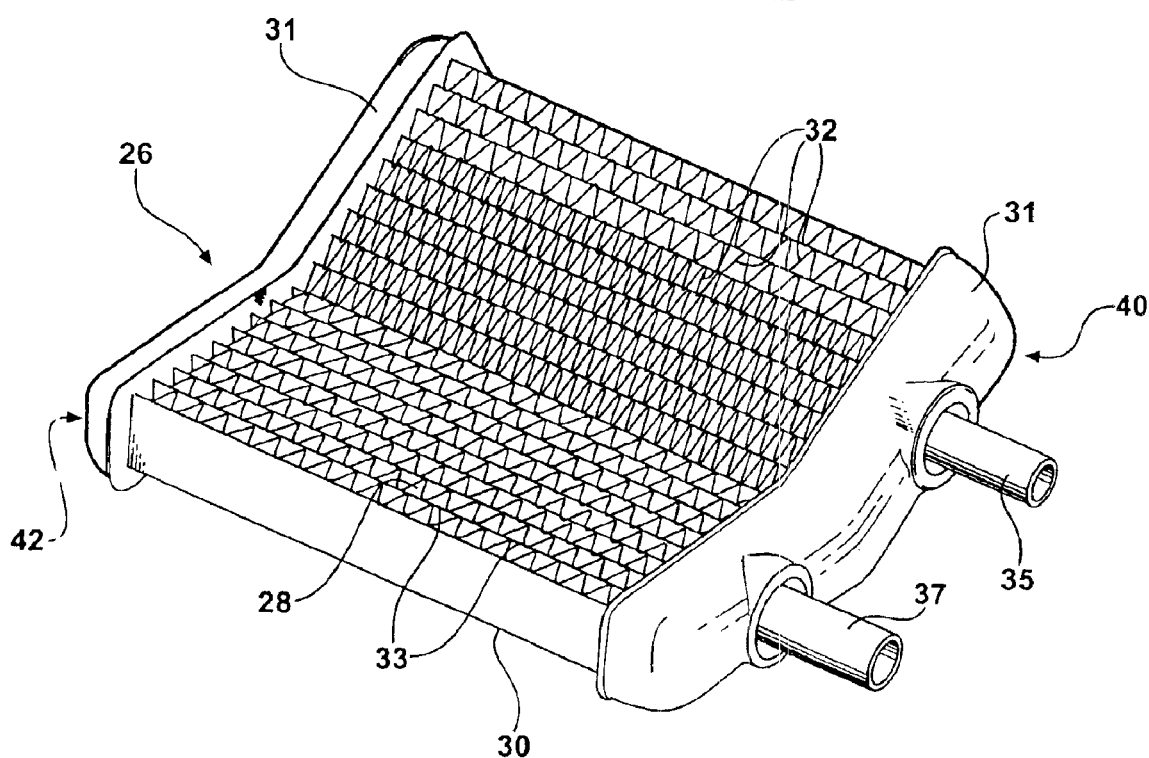
FIG. 4B is a perspective view of another heater core having tubes and fins extending in a horizontal direction with the fins being spaced in a uniform manner.

The heater cores 26 shown in the Figures have slightly different configurations. In particular, FIGS. 3A and 3B illustrate a first embodiment of the heater core 26 wherein the fins 32 and tubes 33 extend in a vertical direction when mounted in the housing 12. The fins 32 and tubes 33 are bent at the intersection of the central regions to define the angled heater core 26. FIGS. 4A and 4B illustrate a second embodiment of the heater core 26 wherein the fins 32 and tubes 33 extend in a horizontal direction when mounted in the housing 12. In addition, the fins 32 can be spaced in a uniform or non-uniform manner. As best shown in FIGS. 1, 2, 3A, and 4A the plurality of fins 32 are spaced apart in a non-uniform manner. In other words, the fins 32 are unequally spaced throughout at least one of the central and peripheral regions. Preferably, the fins 32 have a higher density in the central region of the first portion 40 where the incurring air flow rate is higher. Alternatively, the tubes 33 may be spaced apart in a non-uniform manner in conjunction with or instead of the fins 32. Hence, the tubes 33 and/or fins 32 are unequally spaced throughout at least one of the central and peripheral regions. As shown in FIGS. 3B and 4B, the plurality of fins 32 and tubes 33 are alternatively spaced apart in a uniform manner. In other words, both the fins 32 and tubes 33 are equally spaced throughout the central and peripheral regions.

Figure 5:
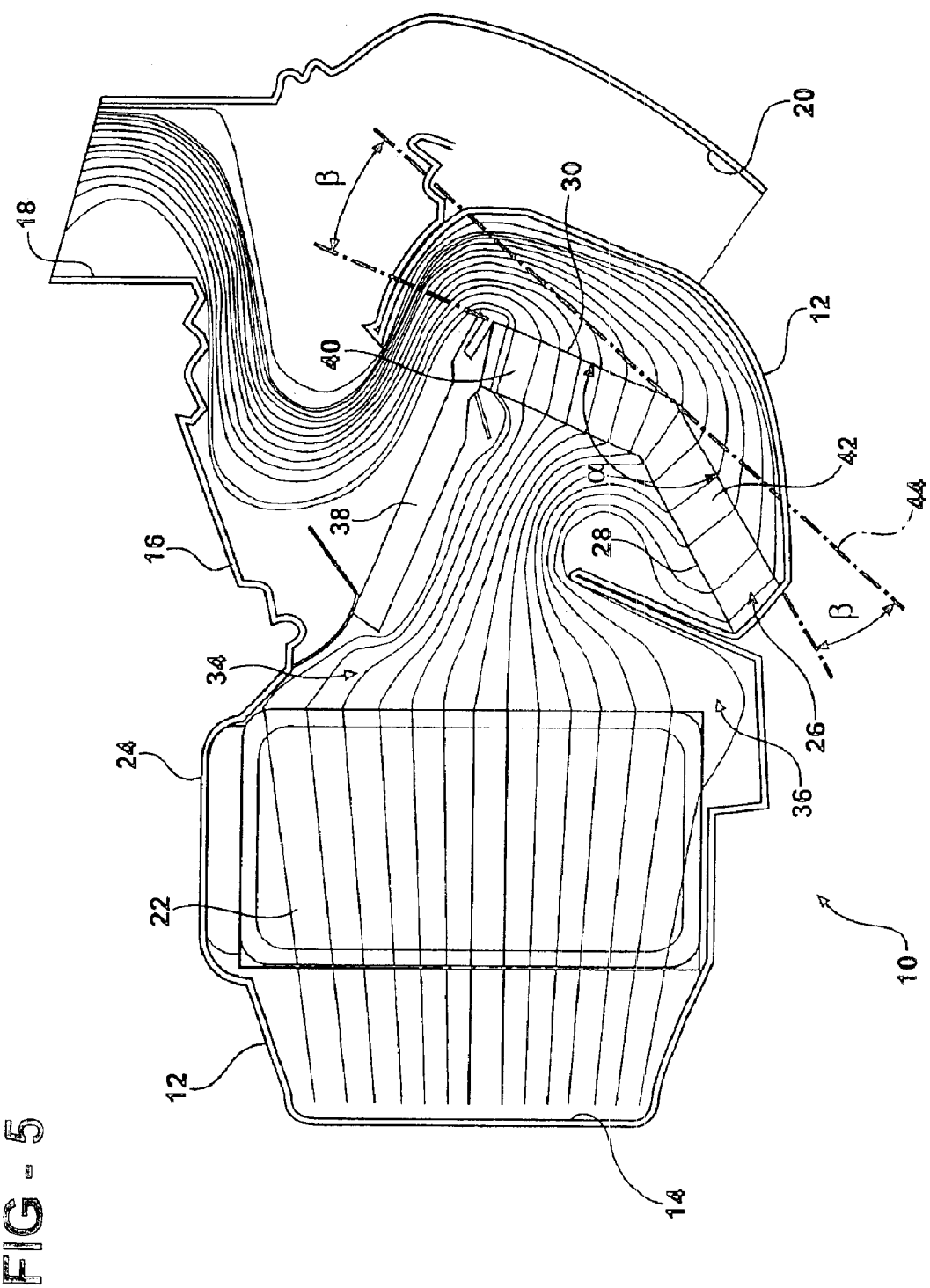
FIG. 5 is a cross sectional side view of the HVAC module with the flow valve in a heating position.

As illustrated in FIG. 5, the air flow is concentrated most in the central region of the first portion 40. Hence, the air velocity is greatest in this region. In order to capitalize on this increased velocity, the fins 32 are concentrated in this area. The remaining regions of the first 40 and second 42 portions have fins 32 that are spaced farther apart. The spacing of fins 32 in the first 40 and second 42 portions controls the velocity of the air flowing through the heater core 26. As such, the increased velocity of the air passing through the central region of the first portion 40 is reduced more than the velocity of the air passing through the other regions of the first 40 and second 42 portions. This equates to having a more uniform exit velocity of the air. By taking advantage of the increased localized velocity of the air, the temperature increase across the heater core 26 can be maximized while the pressure drop across the heater core 26 can be minimized.

Referring also to FIGS. 6 and 7, preferably, the first portion 40 is angled relative to the second portion 42 by more than 90 degrees. The angle between the first 40 and second 42 portions is illustrated in FIGS. 5–7, by the included angle α. Even more preferably, the first portion 40 is angled relative to the second portion 42 by an included angle α of 140 degrees. Specifically, the downstream surface 30 of the first portion 40 is angled relative to the downstream portion of the second portion 42 by an included angle α of 140 degrees.

A bend angle β is also illustrated in FIGS. 5–7 wherein the bend angle β sets forth the angle of the downstream surfaces 30 of the first 40 and second 42 portions relative to a plane 44. The plane 44 is substantially perpendicular to a flow velocity of the air toward the heater core 26, see FIGS. 5–7.

The total velocity vector of the air toward the heater core 26 is labeled as $u_\infty$. When the air hits the heater core 26, the velocity vector $u_\infty$ is split into two different velocity vectors $u_n$ and $u_p$. Velocity vector $u_n$ of the air is the normal component of the velocity vector $u_\infty$ relative to the heater core 26. Stated another way, the velocity vector $u_n$ denotes the velocity of air that is facing the upstream surface 28 of the heater core 26 and subsequently passes through the heater core 26 to exit out the downstream surface 30 of the heater core 26. Velocity vector $u_p$ of the air is the parallel component of the velocity vector $u_\infty$ relative to the heater core 26. In other words, velocity vector $u_p$ denotes the velocity of air that runs parallel along the upstream surface 28 of the heater core 26. This velocity component, $u_p$, defines an inefficiency of the heater core 26 in that a portion of the total velocity of air $u_\infty$ is not passing through the heater core 26. Therefore, it is desirable to always have the velocity vector $u_p$ be smaller than the velocity vector $u_n$.

The bend angle of the heater core 26 directly affects the values of the velocity vectors $u_n$ and $u_p$. Referring to FIG. 8, the velocity vectors for $u_p$ and $u_n$ are illustrated as components of $u_\infty$. As illustrated, the optimum bend angle β, wherein the velocity vector $u_n$ is larger than the velocity vector $u_p$, is less than 45 degrees. In other words, if the first 40 and second 42 portions of the heater core 26 were angled relative to the plane 44 by a bend angle β of more than 45 degrees, the velocity vector $u_p$ would be larger than the velocity vector $u_n$, thereby creating an inefficient heater core 26. Stated another way, if the first portion 40 of the heater core 26 was angled relative to the second portion 42 of the heater core 26 by an included angle α of less than 90 degrees, the velocity vector $u_p$ would be larger than the velocity vector $u_n$, thereby creating an inefficient heater core 26. Using the bend angle β, the preferred angular position of the first 40 and second 42 portions relative to the plane 44 is less than 45 degrees.

Figure 9:
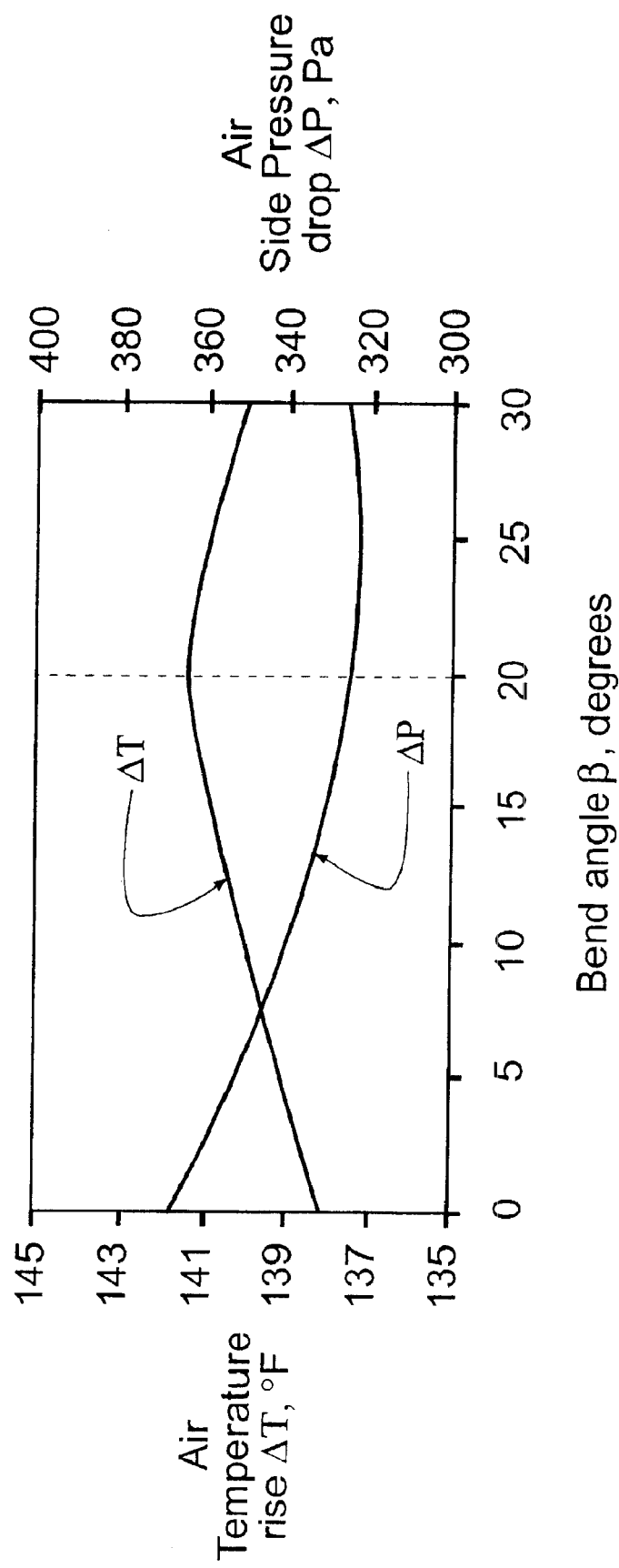
FIG. 9 is a graph illustrating a temperature rise and a pressure drop for various bend angles $\beta$ of the heater core.

The bend angle of the heater core 26 also directly affects the temperature increase values and the pressure drop values. Referring to FIG. 9, the change in temperature and change in pressure are illustrated for various different bend angles of the heater core 26. As illustrated, the optimum bend angle β, wherein the temperature increase is maximized and the pressure drop is minimized, is 20 degrees. Hence, if the first 40 and second 42 portions of the heater core 26 were angled relative to the plane 44 by a bend angle β of significantly more or less than 20 degrees, the temperature increase will reduce and the pressure drop will become larger, thereby creating an inefficient heater core 26. Stated another way, if the first portion 40 of the heater core 26 was angled relative to the second portion 42 of the heater core 26 by an included angle α of significantly more or less than 140 degrees, the temperature increase will reduce and the pressure drop will become larger, thereby creating an inefficient heater core 26.

As appreciated, the preferred included angle α and bend angle β discussed above correlate to each other such that the combination of included angle α plus twice bend angle β equals 180 degrees. In addition, the preferred included angles α and bend angles β can change depending upon the type, design, and configuration of the heater core 26. A method of ideally determining the included angle α and bend angle β for any heat exchanger is set forth in detail below.

As discussed above, the particular angle of the first portion 40 relative to the second portion 42 is important to the performance of any heat exchanger, including the heater core 26 of the subject invention. If the relative angle between the portions 40,42 is not optimized, then the heater core 26 will not operate at its full effectiveness, i.e., the temperature increase will not be maximized and the pressure drop will not be minimized.

Accordingly, the subject invention includes a method of optimizing the flow of air over the heater core 26. The method comprising the step of calculating a variance between incoming and outgoing temperatures of the air to determine a temperature increase across the heater core 26. The method further comprises the step of calculating a variance between incoming and outgoing pressures of the air to determine a pressure drop across the heater core 26. The angular position the first portion 40 of the heater core 26 is then adjusted relative to the second portion 42 of the heater core 26 until the temperature increase across the heater core 26 is maximized and the pressure drop across the heater core 26 is minimized. This adjustment of the first 40 and second 42 portions thereby determines the optimum relative positions of the first 40 and second 42 portions for the angled heater core 26.

One method of calculating the temperature increase across the heater core 26 includes measuring an incoming temperature of the air adjacent the upstream surface 28 of the heater core 26 and measuring an outgoing temperature of the air adjacent the downstream surface 30 of the heater core 26. The outgoing temperature is then subtracted from the incoming temperature to determine the temperature increase. The measurements of the incoming and outgoing temperatures may be accomplished by any suitable device such as a temperature probe. Similarly, one method of calculating the pressure drop across the heater core 26 includes measuring an incoming pressure of the air adjacent the upstream surface 28 of the heater core 26 and measuring an outgoing pressure of the air adjacent the downstream surface 30 of the heater core 26. The incoming pressure is then subtracted from the outgoing pressure to determine the pressure drop. The measurements of the incoming and outgoing pressures may be accomplished in any known manner such as utilizing a pressure probe.

Preferably, as discussed above, the step of adjusting the angular position the first portion 40 relative to the second portion 42 is further defined as adjusting the first 40 and second 42 portions until the first portion 40 is angled relative to the second portion 42 by an included angle α of more than 90 degrees. More preferably, the step of adjusting the angular position of the first portion 40 relative to the second portion 42 is further defined as adjusting the first 40 and second 42 portions until the first portion 40 is angled relative to the second portion 42 by an included angle α of 140 degrees. Even more preferably, the step of adjusting the angular position of the first portion 40 relative to the second portion 42 is further defined as adjusting the first 40 and second 42 portions until the downstream surface 30 of the first portion 40 is angled relative to the downstream portion of the second portion 42 by an included angle α of 140 degrees.

The step of calculating the temperature increase across the heater core 26 may also be accomplished by utilizing the following formula;

$$\Delta T_a = \left(\frac{\dot{m}_c}{\dot{m}_a}\right)\left(\frac{c_c}{c_a}\right)(\Delta T_c)$$

where, $\Delta T_a$ is the temperature increase of the air across the heater core 26, $\dot{m}_a$ is the mass flow rate of the air across the heater core 26, $\dot{m}_c$ is the mass flow rate of the liquid flowing through the heater core 26, $c_a$ is the specific heat of the air, $c_c$ is the specific heat of the liquid passing through the heater core 26, and $\Delta T_c$ is the temperature decrease of the liquid.

The step of calculating the temperature increase across the heater core is further defined as subtracting an inlet temperature of the liquid from an outlet temperature of the liquid to obtain the $\Delta T_c$ temperature decrease. As discussed above, one or more of the manifolds 31 include an inlet port 35 and/or an outlet port 37 such that the inlet and outlet temperatures of the liquid can be measured. The above formula for calculating the temperature increase eliminates the need for a temperature probe disposed in the airflow path of the air. The mass flow rate of the air $\dot{m}_a$ and the mass flow rate of the liquid $\dot{m}_c$ are easily determined and the specific heat of the air $c_a$ and the specific heat of the liquid $c_c$ are known constants. In addition, the temperature measurements of the liquid at the inlet 35 and outlet 37 ports can be easily determined. Hence, the above temperature formula simplifies the process for determining the temperature increase across the heater core 26.

The step of calculating the pressure drop across the heater core 26 may also be accomplished by utilizing the following formula;

$$\Delta P_a = \frac{2fl\dot{m}_a^2\cos^2\beta}{\rho_a g_c d_h A^2}$$

where, $\Delta P_a$ is the pressure drop of the air across the heater core 26, f is a coefficient of friction within the heater core 26, l is a depth or thickness of the heater core 26, $\dot{m}_a$ is a mass flow rate of the air across the heater core 26, $\beta$ is a bend angle the first 40 and second 42 portions relative to a plane 44 with the plane 44 being substantially perpendicular to a flow of the air toward the heater core 26, $\rho_a$ is a density of the air, $g_c$ is the constant of proportionality in Newton's second law of motion, $d_h$ is a hydraulic diameter of the flow passages through the heater core, and A is a face area of the upstream surface of the heater core.

The above formula for calculating the pressure drop eliminates the need for a pressure probe disposed in the airflow path of the air. The values for the coefficient of friction f, depth of thickness l of the heater core 26, mass flow rate of the air $\dot{m}_a$, density of the air $\rho_a$, hydraulic diameter of the flow passages $d_h$, and area A of the upstream surface 28 are all known. The coefficient of friction or friction factor f is dependent upon the airside fin configuration within the heater core 26. Hence, the friction factor f for each of the heater cores 26 shown in FIGS. 3A–4B will be different. The remaining value is to determine the bend angle $\beta$. As discussed above, the step of adjusting the angular position of the first portion 40 relative to the second portion 42 is further defined as adjusting the first 40 and second 42 portions until the bend angle $\beta$ is less than 45 degrees. Even more preferably, the step of adjusting the angular position the first portion 40 relative to the second portion 42 is further defined as adjusting the first 40 and second 42 portions until the bend angle $\beta$ is 20 degrees. Each of the values for the pressure formula set forth above are quickly determined such that this formula simplifies the process for determining the pressure drop across the heater core 26.

Obviously, many modifications and variations of the present invention are possible in light of the above teachings. The invention may be practiced otherwise than as specifically described within the scope of the appended claims, wherein the reference numerals in the claims are merely for convenience and are not to be read in any way as limiting.

What is claimed is:

1. A heating, ventilating, and air conditioning assembly for heating, venting, and cooling a passenger compartment of a vehicle, said assembly comprising;

a hollow housing having an inlet and at least one outlet for directing a flow of air into the passenger compartment;

a first heat exchanger disposed within said housing downstream of said inlet and upstream from said outlet with said first heat exchanger being an evaporator core arranged and configured for intercepting substantially all of the air flowing into the passenger compartment; and a second heat exchanger disposed within said housing between said first heat exchanger and said outlet with said second heat exchanger being a heater core having an upstream surface generally facing said first heat exchanger and a downstream surface generally facing said outlet;

said second heat exchanger including a first portion having a plurality of fins spaced from each other and a second portion having a plurality of fins spaced from each other wherein said plurality of fins of each of said first and second portions of said heater core are spaced apart from each other in a non-uniform manner, with said first and second portions each having central and peripheral regions with said fins extending continuously across said regions with said plurality of fins of said first portion having a higher concentration in said central region and said central regions abutting each other such that said fins of said second heat exchanger extend continuously between said opposing peripheral regions of said portions, said second portion being angled relative to said first portion such that said upstream surface of said first portion at least partially faces said upstream surface of said second portion to define an angled second heat exchanger facing said first heat exchanger wherein air flowing over said upstream surfaces is evenly distributed across said plurality of fins of both of said first and second portions, thereby increasing the effectiveness of said second heat exchanger.

2. An assembly as set forth in claim 1 wherein said first portion is angled relative to said second portion by more than 90 degrees.

3. An assembly as set forth in claim 2 wherein said first portion is angled relative to said second portion by 140 degrees.

4. An assembly as set forth in claim 3 wherein said downstream surface of said first portion is angled relative to said downstream portion of said second portion by 140 degrees.

5. An assembly as set forth in claim 4 wherein each of said first and second portions have a substantially flat rectangular configuration.

6. An assembly as set forth in claim 1 wherein said plurality of fins of said second portion of said heater core are spaced apart from each other in a uniform manner.

7. An assembly as set forth in claim 1 wherein said housing further includes an upper quadrant and a lower quadrant with said evaporator core disposed within both of said quadrants and said heater core disposed within said lower quadrant.

8. An assembly as set forth in claim 7 further including at least one flow valve disposed within said housing for controlling the flow of air between said upper and lower quadrants.

9. An assembly as set forth in claim 7 wherein said housing further includes three outlets for distributing the flow of air throughout the passenger compartment.

* * * * *